H. ARNOLD.
SEEDING MACHINE.
APPLICATION FILED JUNE 4, 1909.

939,964.  Patented Nov. 16, 1909.

WITNESSES:

INVENTOR.
Henry Arnold
BY
ATTORNEYS

UNITED STATES PATENT OFFICE.

HENRY ARNOLD, OF NEWMARKET, ONTARIO, CANADA.

SEEDING-MACHINE.

939,964.  Specification of Letters Patent.  Patented Nov. 16, 1909.

Application filed June 4, 1909. Serial No. 500,098.

*To all whom it may concern:*

Be it known that I, HENRY ARNOLD, of the town of Newmarket, Province of Ontario, Canada, have invented certain new and useful Improvements in Seeding-Machines, of which the following is a specification.

In the sowing of grain it is well known that drilling possesses the advantage that the seed is well covered, and broadcasting the advantage that the seed is more evenly distributed on the soil.

My object is to devise means for combining the respective advantages of drilling and broadcasting so that the seed is both evenly distributed and thoroughly covered.

I attain my object by providing drill hoes of the ordinary type with a cultivator shoe concave underneath and having a seed distributing plate located at its underside below the seed opening of the hoe.

Figure 4:
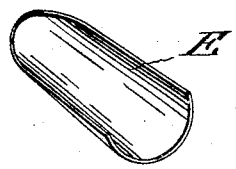
Figure 1:
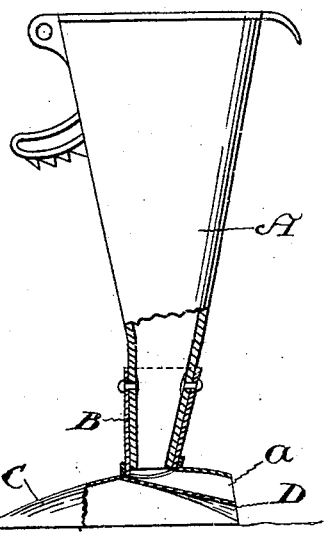
Figure 2:
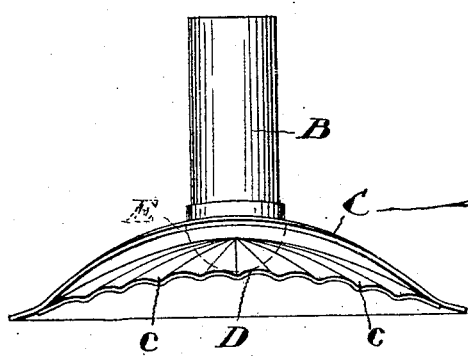
Figure 3:
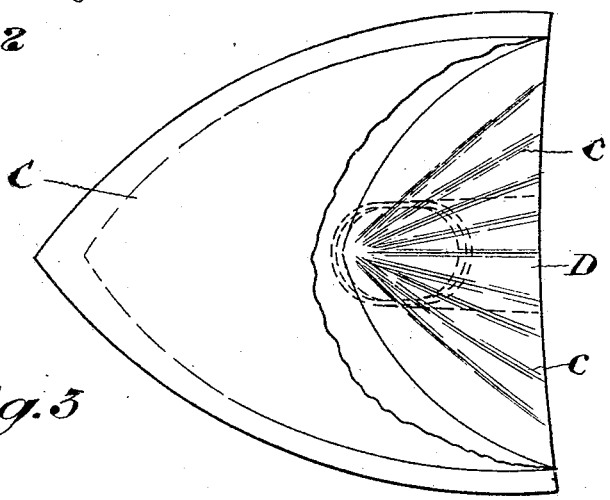

Figure 1 is a side elevation of my improved seeding device partly in section. Fig. 2 is an enlarged rear elevation of the same. Fig. 3 is a plan view of the same partly broken away. Fig. 4 is a perspective detail of a seed drilling attachment.

In the drawings like letters of reference indicate corresponding parts in the different figures.

Referring particularly to Fig. 1 A is a drill hoe of ordinary construction save that its lower end is preferably modified somewhat to adapt it to fit within the collar B of a cultivator shoe C of special construction. In plan this shoe is approximately triangular, as is seen particularly in Fig. 3, and it is concave underneath rising gradually from the point to the point of attachment to the collar B, thence preferably falling slightly toward the rear. Its transverse sections are approximately arcs of circles. The shoe is thus open behind.

Underneath the shoe is located the distributing plate D, which extends from the forward edge of the opening a leading to the drill hoe rearwardly to the rear end of the shoe. This plate slopes rearwardly and is also inclined laterally from its center line being preferably curved in cross section, as shown in Fig. 2. This distributing plate is also preferably provided with rearwardly radiating grooves C. The result of this construction of the distributing plate is that seed falling through the opening a radiates over the plate D and is discharged substantially evenly over the whole width of the rear end of the plate.

The function of the cultivator shoe is to open up a broad furrow in the soil in which the seed is deposited. Owing to the shape of the shoe the soil is not thrown out laterally to any extent but is simply lifted and drops back into place behind the shoe in almost its original position, leaving the seed thoroughly covered. By this arrangement it will be seen that the seed is substantially as widely and evenly distributed in the soil as in broadcasting, and is as thoroughly covered as in drilling, thus combining the advantages of both methods of seeding.

I do not desire, of course, to restrict myself to the exact details of construction shown. The device may be applied to drill hoes, such as shown, constructed specially for the purpose, or may be made for attachment to any drill hoes of any type now in use.

In Fig. 4 I show a seed drilling attachment which comprises a metal scoop E which may be inserted below the opening a as shown in dotted lines in Figs. 2 and 3 to cause the grain to be deposited in the center only of the furrow.

What I claim as my invention is:—

1. In seeding apparatus the combination of an approximately triangular cultivator shoe convexly curved both longitudinally and transversely; a distributing plate located underneath the arch of the shoe; and means for discharging grain onto said plate.

2. In seeding apparatus the combination of an approximately triangular cultivator shoe convexly curved both longitudinally and transversely; a distributing plate located underneath the arch of the shoe provided with rearwardly inclined radiating grooves; and means for discharging grain onto said plate over the point from which said grooves radiate.

3. In seeding apparatus the combination of a rearwardly-inclined, transversely-convexed distributing plate; means for discharging grain onto said plate; and a cultivator shoe adapted to open up the soil for the passage of the distributing plate and to allow the soil to close over the distributed seed.

4. In seeding apparatus the combination of a rearwardly inclined transversely convexed distributing plate provided with rearwardly radiating grooves, means for discharging grain into said plate over the point from which said grooves radiate and a cultivator shoe adapted to open up the soil for the passage of the distributing plate and to allow the soil to close over the distributed seed.

5. In seeding apparatus the combination of a cultivator shoe concave underneath and having a seed opening therein; seed distributing means located below said opening; means for conveying seed to said opening; and a scoop insertible between the shoe and seed distributing means.

Newmarket, Ont. this eleventh day of May 1909.

HENRY ARNOLD.

Signed in the presence of—
W. C. WIDDIFIELD,
C. W. WIDDIFIELD.